United States Patent
Pan et al.

(10) Patent No.: US 9,215,221 B2
(45) Date of Patent: Dec. 15, 2015

(54) METHOD FOR IMPLEMENTING LOCAL ROUTING OF TRAFFIC, BASE STATION AND SYSTEM

(75) Inventors: Su Pan, Shenzhen (CN); Zhiming Ding, Shenzhen (CN); Guiming Shu, Shenzhen (CN); Zhiyong Zhang, Shenzhen (CN); Guoqiao Chen, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 618 days.

(21) Appl. No.: 13/331,803

(22) Filed: Dec. 20, 2011

(65) Prior Publication Data
US 2012/0163597 A1    Jun. 28, 2012

(30) Foreign Application Priority Data

Dec. 24, 2010   (CN) ........................... 2010 1 0606161

(51) Int. Cl.
| | |
|---|---|
| *H04L 9/00* | (2006.01) |
| *H04L 29/06* | (2006.01) |
| *H04L 9/08* | (2006.01) |
| *H04W 12/02* | (2009.01) |

(Continued)

(52) U.S. Cl.
CPC .............. *H04L 63/06* (2013.01); *H04L 9/0891* (2013.01); *H04L 63/0464* (2013.01); *H04W 12/02* (2013.01); *H04L 2209/80* (2013.01); *H04W 12/04* (2013.01); *H04W 88/08* (2013.01)

(58) Field of Classification Search
CPC ... H04L 9/0891; H04L 63/0464; H04L 63/06; H04L 2209/80; H04W 12/02; H04W 88/08; H04W 12/04
See application file for complete search history.

(56) References Cited

U.S. PATENT DOCUMENTS

| | | | |
|---|---|---|---|
| 2005/0215234 A1 | 9/2005 | Fukuzawa et al. | |
| 2007/0074022 A1 | 3/2007 | Wang et al. | |

(Continued)

FOREIGN PATENT DOCUMENTS

| | | | |
|---|---|---|---|
| CN | 1674496 A | 9/2005 | |
| CN | 1691583 A | 11/2005 | |

(Continued)

OTHER PUBLICATIONS

Borden et al., "Leveraging 802.16e in Airport Surface Communications Networks" IEEE 2009.

(Continued)

*Primary Examiner* — Jeffrey Pwu
*Assistant Examiner* — Nega Woldemariam
(74) *Attorney, Agent, or Firm* — Brinks Gilson & Lione

(57) ABSTRACT

Embodiments of the present invention provide a method for implementing local routing of traffic, a base station and a system are provided, which relate to the field of communications technologies. The method for implementing local routing of traffic includes: judging whether local routing processing is performed on an uplink traffic flow of a first terminal that serves as a sending end; if it is judged as yes, updating a key of the uplink traffic flow of the first terminal and/or a key of a downlink traffic flow of a second terminal that serves as a receiving end to a public key; forwarding an encrypted data packet of the uplink traffic flow of the first terminal to the second terminal through the downlink traffic flow of the second terminal, where an encryption and decryption operation is not performed on the encrypted data packet before the forwarding or during the forwarding.

10 Claims, 5 Drawing Sheets

(51) Int. Cl.
*H04W 12/04* (2009.01)
*H04W 88/08* (2009.01)

(56) References Cited

U.S. PATENT DOCUMENTS

| | | | |
|---|---|---|---|
| 2007/0288744 | A1 | 12/2007 | Wang |
| 2009/0019284 | A1* | 1/2009 | Cho et al. ............... 713/170 |
| 2009/0279522 | A1 | 11/2009 | Leroy et al. |
| 2010/0020974 | A1* | 1/2010 | Tsai et al. ............... 380/270 |
| 2010/0315992 | A1 | 12/2010 | Turanyi |
| 2011/0044454 | A1* | 2/2011 | Baek et al. ............... 380/273 |
| 2012/0163597 | A1 | 6/2012 | Pan et al. |

FOREIGN PATENT DOCUMENTS

| | | |
|---|---|---|
| CN | 101309505 A | 11/2008 |
| CN | 101577678 A | 11/2009 |
| CN | 101940014 A | 1/2011 |
| CN | 102036230 A | 4/2011 |

OTHER PUBLICATIONS

WiMAX Forum® Network Architecture, "Architecture Tenets, Reference Model and Reference Points Base Specification" WMF-T32-001-R015v01, WiMAX Forum® Approved. Nov. 21, 2009.

WiMAX Forum® Network Architecture, Detailed Protocols and Procedures Base Specification WMF-T33-001-R015v01, WiMAX Forum® Approved. Nov. 21, 2009.

IEEE Standard for Local and Metropolitan Area Networks, "Part 16: Air Interface for Broadband Wireless Access Systems" IEEE Computer Society, IEEE Std 802,16™—May 29, 2009.

Written Opinion of the International Searching Authority issued in corresponding PCT Patent Application No. PCT/CN2011/084178, mailed Mar. 22, 2012, 5 pages.

International Search Report issued in corresponding PCT Patent Application No. PCT/CN2011/084178, mailed Mar. 22, 2012.

Search Report issued in corresponding Chinese Patent Application No. 2010106061617, mailed Sep. 17, 2012.

* cited by examiner

METHOD FOR IMPLEMENTING LOCAL ROUTING OF TRAFFIC, BASE STATION AND SYSTEM

CROSS-REFERENCE TO RELATED APPLICATIONS

This application claims priority to Chinese Patent Application No. 201010606161.7, filed on Dec. 24, 2010, which is hereby incorporated by reference in its entirety.

FIELD OF THE INVENTION

The present invention relates to the field of communications technologies, and in particular, to a method for implementing local routing of traffic, a base station and a system.

BACKGROUND OF THE INVENTION

A mobile station (Mobile Station, MS) is connected to a WiMAX (Worldwide Interoperability for Microwave Access, Worldwide Interoperability for Microwave Access) network via a base station (Base Station, BS). During data transmission, the MS uses its TEK (Traffic Encryption Keys, packet key) to encrypt data in a packet and sends the packet to the BS, and then the BS decrypts the data in the packet and then transmits it to a network side. The TEK acts on an air interface part of a traffic flow. This key is used for encryption and decryption of packets in one traffic flow during transmission on an air interface, and multiple traffic flows may exist in one MS during communication. A traffic flow is a transmission flow of certain traffic from the MS to an anchor access gateway of the MS. When the traffic flow is transmitted between the MS and the BS, that is, through the air interface, a corresponding TEK is used for protection.

If a traffic interaction is performed between two users in the WiMAX network as shown in FIG. 1, a general implementation procedure is described as follows:

A mobile station MS-A uses its packet key TEK-A to encrypt data in a packet, and sends a protected packet to a base station BS-A. Afterwards, the BS-A uses the TEK-A to decrypt the protected packet, and sends the decrypted packet to a network side entity; after being routed, the packet arrives at a management base station BS-C of a mobile station MS-C, and the BS-C uses a packet key TEK-C corresponding to the MS-C to encrypt the data in the received packet, and sends the encrypted packet to the MS-C through an air interface. Finally, the MS-C uses the TEK-C to decrypt the encrypted text in the received packet, so as to obtain plain text of the data.

If the above mobile stations MS-A and MS-C are managed by a same base station, the foregoing base stations BS-A and BS-C are the same base station. In such a situation, the packet that the MS-A sends to the MS-C may be directly forwarded in downlink to the MS-C after the BS receives an uplink packet sent by the MS-A, without being forwarded by the BS to an upper network entity, then returned to the BS, and finally sent to the MS-C. In this case, the above transmission procedure is referred to as local routing of traffic under the same BS.

During the procedure of implementing the local routing under the same BS, although two mobile stations exchange data under the same BS and route the data packet locally through the BS, the two mobile stations use different TEKs, so the BS still needs to first decrypt and then encrypt the received packet, and forwards the packet to a packet destination terminal, which wastes processing time and power consumption of the BS.

SUMMARY OF THE INVENTION

Embodiments of the present invention provide a method for implementing local routing of traffic, a base station and a system, so as to simplify a data processing procedure at the base station and reduce system overheads.

In order to achieve the above objectives, an embodiment of the present invention adopts the following technical solution.

A method for implementing local routing of traffic includes:
judging whether local routing processing is performed on an uplink traffic flow of a first terminal that serves as a sending end;
if it is judged as yes, updating a key of the uplink traffic flow of the first terminal and/or a key of a downlink traffic flow of a second terminal that serves as a receiving end to a public key; and
forwarding an encrypted data packet of the uplink traffic flow of the first terminal to the second terminal through the downlink traffic flow of the second terminal, where an encryption and decryption operation is not performed on the encrypted data packet before the forwarding or during the forwarding.

A base station includes:
a judging module, configured to judge whether local routing processing is performed on an uplink traffic flow of a first terminal that serves as a sending end;
an updating module, configured to update a key of the uplink traffic flow of the first terminal and/or a key of a downlink traffic flow of a second terminal that serves as a receiving end to a public key when an output result of the judging module is yes; and
a forwarding module, configured to forward an encrypted data packet of the uplink traffic flow of the first terminal to the second terminal through the downlink traffic flow of the second terminal after the updating module finishes updating the key, where an encryption and decryption operation is not performed on the encrypted data packet before the forwarding or during the forwarding.

A communication system includes a first terminal that serves as a sending end, a second terminal that serves as a receiving end, and a base station, where
the base station is configured to judge whether local routing processing is performed on an uplink traffic flow of the first terminal, and update a key of the uplink traffic flow of the first terminal and/or a key of a downlink traffic flow of the second terminal to a public key if a judgment result is yes; forward an encrypted data packet of the uplink traffic flow of the first terminal to the second terminal through the downlink traffic flow of the second terminal, where an encryption and decryption operation is not performed on the encrypted data packet before the forwarding or during the forwarding.

In the method for implementing local routing of traffic, the base station and the system provided in the embodiments of the present invention, after receiving an uplink data stream from the first terminal, the base station extracts related information from the data stream to determine whether local routing processing is required; if the local routing processing is performed, the base station updates respective keys adopted in the encryption and decryption operation of the first terminal and of the second terminal, so that the two keys are maintained uniform. In this manner, in a subsequent local routing procedure, the keys adopted by the uplink traffic flow of the first terminal that serves as a data sending end and the downlink traffic flow of the second terminal that serves as a data receiving end are the same, so operations of first decryption and then encryption on the received encrypted data packet are not required at the base station side. Therefore, data processing at the base station during the local routing procedure is simplified, and meanwhile, system overheads are reduced.

BRIEF DESCRIPTION OF THE DRAWINGS

To describe the technical solutions according to the embodiments of the present invention or in the prior art more clearly, the accompanying drawings required for describing the embodiments are introduced below briefly. Apparently, the accompanying drawings in the following descriptions merely show some of the embodiments of the present invention, and persons skilled in the art can obtain other drawings according to the accompanying drawings without creative efforts.

DETAILED DESCRIPTION OF THE EMBODIMENTS

The technical solutions of the present invention are clearly and fully described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

A method for implementing local routing of traffic, a base station and a system provided in embodiments of the present invention are described in detail below with reference to the accompanying drawings.

Embodiment 1

Figure 1:
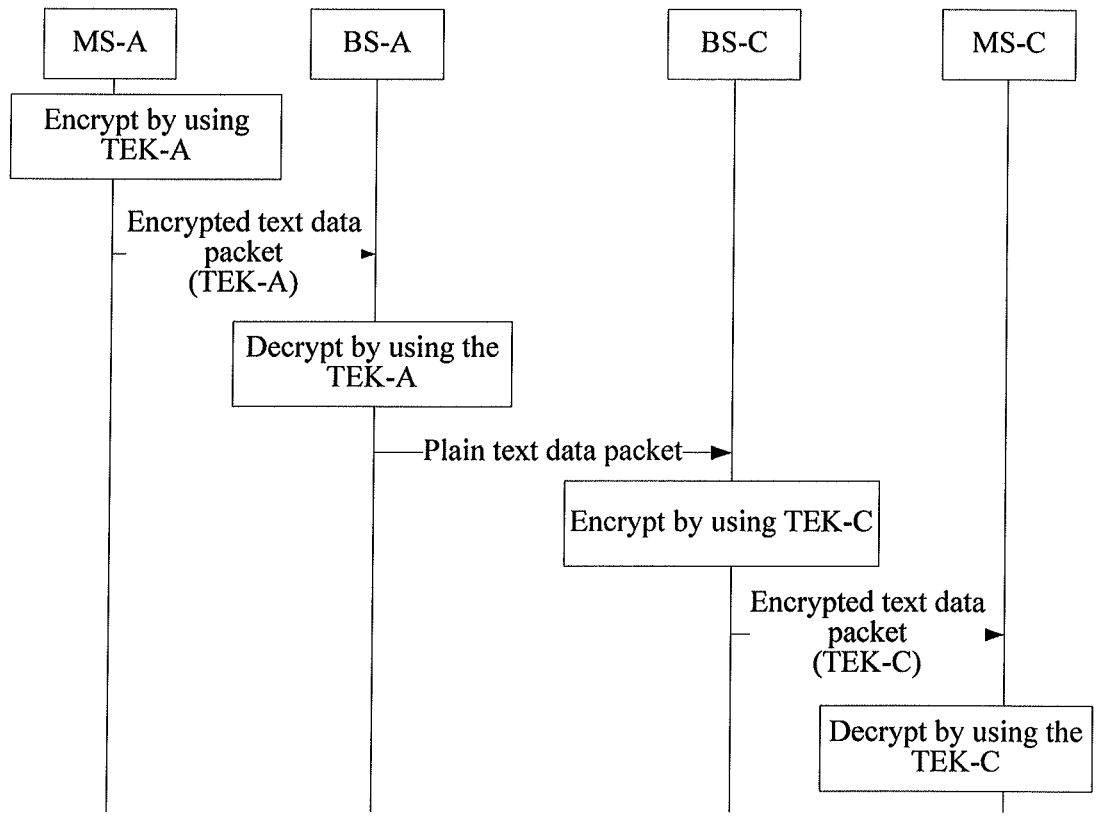
FIG. 1 is a signaling flow chart of a routing procedure in the prior art.
Figure 2:
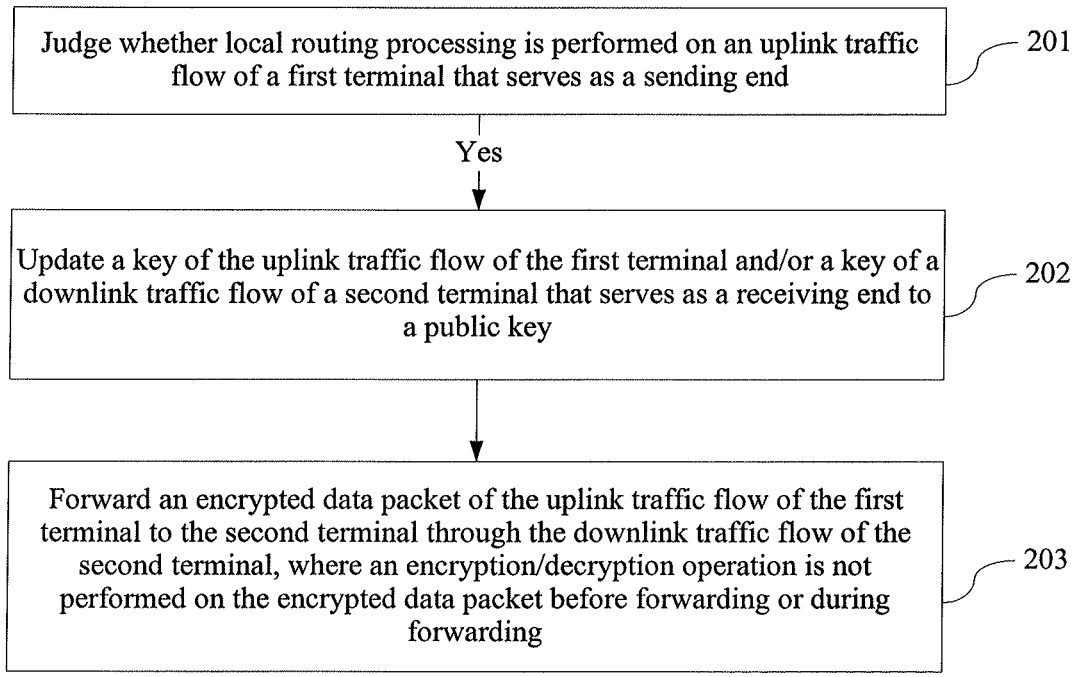
FIG. 2 is a flow chart of a method for implementing local routing of traffic in Embodiment 1 of the present invention.

As shown in FIG. 2, a method for implementing local routing of traffic provided in the embodiment of the present invention includes:

201: Judge whether local routing processing is performed on an uplink traffic flow of a first terminal that serves as a sending end.

Specifically, it may be judged whether the local routing processing is performed on the uplink traffic flow when a first packet of the uplink traffic flow of the first terminal that serves as the sending end is received; or it is judged whether the local routing processing is performed on the uplink traffic flow when the uplink traffic flow of the first terminal that serves as the sending end is created.

202: If a judgment result in step 201 is yes, update a key of the uplink traffic flow of the first terminal and/or a key of a downlink traffic flow of a second terminal that serves as a receiving end to a public key.

The public key is a key used by both the uplink traffic flow of the first terminal and the downlink traffic flow of the second terminal.

In this step, the key adopted by the uplink traffic flow of the first terminal that serves as the sending end and the key adopted by the downlink traffic flow of the second terminal that serves as the receiving end are set to the same key, namely the public key; the first terminal uses the public key to encrypt a data packet, and the second terminal can also use the public key to decrypt a received encrypted data packet. That is, the second terminal can directly decrypt the encrypted data packet that is encrypted by the first terminal, and in this manner, the procedure that the base station decrypts and then encrypts the encrypted data packet is not performed, thereby simplifying the data processing procedure at a base station side.

203: Forward the encrypted data packet of the uplink traffic flow of the first terminal to the second terminal through the downlink traffic flow of the second terminal, where encryption and decryption operations are not performed on the encrypted data packet before the forwarding or during the forwarding.

The meaning of "encryption and decryption operations are not performed on the encrypted data packet" specifically refers to that the encrypted data packet is not "decrypted and then encrypted", where keys adopted in a decryption procedure and an encryption procedure before the keys are set to the public key are different.

In the above method description, the numbers of the steps are not intended to define a specific execution sequence. For example, step 202 may be immediately executed after step 201, and may also be executed at a proper time, for example, executed after forwarding of the first packet is finished. Moreover, after step 202 is finished, step 203 may be repeatedly executed for multiple times.

Figures 3, 4:
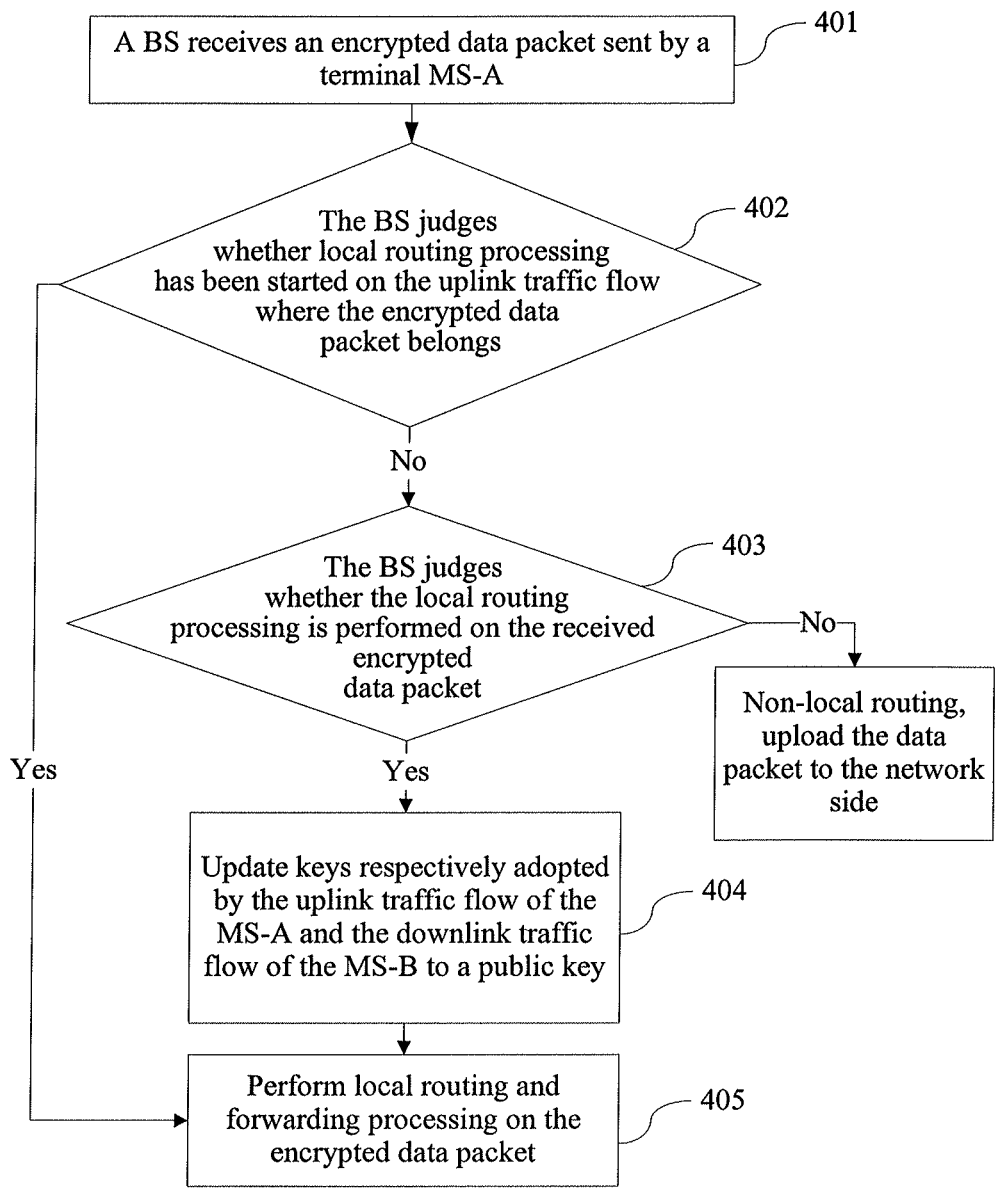
FIG. 3 is a schematic structural diagram of a base station in Embodiment 1 of the present invention.
FIG. 4 is a flow chart of a method for implementing local routing of traffic in Embodiment 2 of the present invention.

Corresponding to the above method for implementing local routing of traffic, the embodiment of the present invention further provides a base station applicable to implementing the above method. As shown in FIG. 3, the base station includes:

a judging module 31, configured to judge whether a local routing processing is performed on an uplink traffic flow of a first terminal that serves as a sending end.

an updating module 32, configured to update a key of the uplink traffic flow of the first terminal and/or a key of a downlink traffic flow of a second terminal that serves as a receiving end to a public key when an output result of the judging module 31 is yes; and a forwarding module 33, configured to forward an encrypted data packet of the uplink traffic flow of the first terminal to the second terminal through the downlink traffic flow of the second terminal after the updating module 32 finishes updating the key, where an encryption and decryption operation is not performed on the encrypted data packet before the forwarding or during the forwarding.

In the method for implementing local routing of traffic and the base station provided in the embodiment of the present invention, after receiving an uplink data stream from the first terminal, the base station extracts related information from the data stream to determine whether local routing processing is required; if the local routing processing is performed, the base station updates respective keys adopted in the encryption and decryption operation of the first terminal and of the second terminal, so that the two keys are maintained uniform. In this manner, in a subsequent local routing procedure, the keys adopted by the uplink traffic flow of the first terminal that serves as a data sending end and the downlink traffic flow of the second terminal that serves as a data receiving end are the same, so operations of first decryption and then encryption on the received encrypted data packet are not required at the base station side. Therefore, data processing at the base station during the local routing procedure is simplified, and meanwhile, system overheads are reduced.

Embodiment 2

In this embodiment, the method for implementing local routing of traffic is further described through a complete implementation procedure.

As shown in FIG. 4, a method for implementing local routing of traffic provided in the embodiment of the present invention specifically includes the following steps:

401: A base station BS receives an encrypted data packet sent by a terminal MS-A.

Because the data packet is sent from an MS to a BS, and the BS is an upper device of the MS, the data packet is referred to as an uplink data packet, and a traffic flow where the data packet belongs is referred to as an uplink traffic flow. The data packet is also referred to as a packet, and therefore the encrypted data packet is also referred to as an encrypted text packet, or an encrypted packet, namely a data packet or packet including encrypted text.

402: The base station judges whether local routing processing has been in performing on the uplink traffic flow where the encrypted data packet belongs.

If the local routing processing is performed, the process proceeds to step 405 for further processing; if it is set that the uplink traffic flow cannot be routed locally, the process is finished, and subsequent processing is non-local routing and forwarding. If a local routing judgment has not been performed on the uplink traffic flow, the process proceeds to step 403 for processing.

403: The base station BS judges whether the local routing processing is performed on the received encrypted data packet, rather than forwards the received encrypted data packet to an upper network entity.

Generally, such judgment processing only needs to be performed when a first packet of the uplink traffic flow is received. Once a judgment result is obtained, whether the uplink traffic flow where the data packet belongs is routed locally can be set, and therefore, such judgment does not need to be performed on subsequent packets.

Apart from judging whether the local routing processing is performed on the uplink traffic flow when the base station BS receives the first data packet of the uplink traffic flow, whether the local routing processing is performed may be judged when the uplink traffic flow is created. The specific time for judging whether the local routing processing is performed on the uplink traffic flow is not the focus of the present invention, and a judgment method of local routing is specifically described herein.

Specifically, the base station BS decrypts the received encrypted data packet, so as to check a destination IP address carried in the data packet, and judges whether a terminal MS-B that serves as a receiving end is located under the same base station BS as the terminal MS-A according to the destination IP address.

If the destination IP address is in an IP information table of the present BS, it indicates that the terminals MS-B and MS-A are under the same BS, and local routing under the same BS is started for the uplink traffic flow. Specifically, a piece of state information of the uplink traffic flow may be set to a certain value, meaning "local routing".

If the destination IP address is not in the IP information table of the present BS, it indicates that the receiving terminal MS-B of the data packet and the sending terminal MS-A of the data packet are not managed by the same BS, and the local routing under the same BS cannot be performed on the uplink traffic flow. Therefore, the data packet is processed according to an original protocol mechanism, that is, the base station decrypts the encrypted text and then forwards the data packet to an upper level network entity of the base station, so that the data packet can be ultimately routed to the base station where the terminal MS-B belongs.

404: If the local routing in the BS is performed on the uplink traffic flow of the terminal MS-A, in order to avoid decrypting and then encrypting data in the data packet when the encrypted data packet is forwarded from the MS-A to the MS-B during a subsequent local routing procedure, update a key adopted by the uplink traffic flow of the terminal MS-A and a key adopted by the downlink traffic flow of the terminal MS-B to the same key, namely a public key.

If in the subsequent local routing procedure, the encrypted data packet received by the base station BS is still a data packet encrypted through a non-public key, the encrypted data packet needs to be decrypted and then encrypted before the packet is forwarded to the receiving terminal MS-B.

Generally, protection for a data packet includes two parts, namely encryption of data in the data packet and completeness check of the data packet. A packet header of the data packet may be modified during forwarding, for example, a change of an MAC address, or a change of some flag bits, and check on such information may be included in the completeness check of the data packet. Therefore, even if the data in the data packet does not need to be decrypted and then encrypted when the data packet is forwarded according to the present invention, check information of the data packet may still need to be regenerated. This is a data packet protection method in the existing WiMAX air interface specifications. The present invention mainly implements that the encrypted data does not need to be decrypted and then encrypted when the data is locally routed and forwarded by the base station, while the check information of the data packet is still processed according to the existing specifications.

Figure 5:
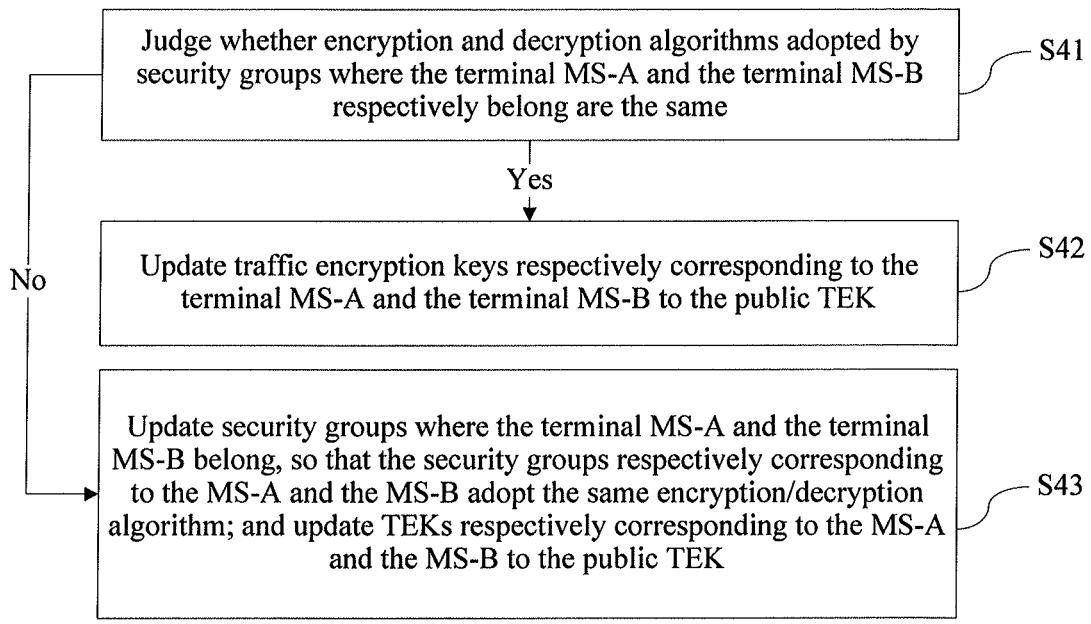
FIG. 5 is a flow chart of a specific implementation procedure of step 404 in FIG. 4.

Specifically, the procedure of updating the traffic flow keys respectively corresponding to the terminal MS-A and the terminal MS-B to the public key includes the following two situations. As shown in FIG. 5, a general implementation procedure is described as follows:

S41: Judge whether encryption and decryption algorithms adopted by security association (Security Association, SA)s related to the uplink traffic flow of the terminal MS-A and the downlink traffic flow of the terminal MS-B respectively are the same.

The security association is a set of security related parameters that are negotiated by the base station BS and the terminal MS and are used for a specific traffic flow, and therefore, the base station BS may compare security associations of the uplink traffic flow and the corresponding downlink traffic flow of the two terminals related to the local routing. In addition, when the terminal is attached to the base station, the base station obtains all encryption algorithms supported by the terminal, and therefore the base station may modify a certain algorithm of the security association to another algorithm supported by the terminal.

In step S41, algorithm identifiers of a security association SA1 of the uplink traffic flow of the terminal MS-A and a security association SA2 of the downlink traffic flow of the terminal MS-B may be compared to know whether the encryption and decryption algorithms adopted by the security associations SA1 and SA2 are the same. A group of algorithm identifiers are defined in the existing WiMAX specifications. Each algorithm identifier indicates information adopted by an SA, such as the encryption algorithm and completeness check, namely a data authentication method. The present invention concerns only the uniformity of the data encryption algorithms. Data completeness check information relates to a variable information part in the packet, and therefore, even if the encrypted data does not need to be decrypted and then encrypted when the data packet is forwarded, the data completeness check information still needs to be regenerated. Therefore, in the present invention, it is not necessarily to set the data authentication methods to be the same when the encryption algorithms of the uplink traffic flow and the downlink traffic flow are set to a public encryption algorithm. Definitely, whether to set the data authentication methods of the uplink traffic flow and the downlink traffic flow to be the same is not limited in the present invention.

If the encryption and decryption algorithms are the same, step S42 is executed; if the encryption and decryption algorithms are different, step S43 is executed.

S42: When the encryption and decryption algorithms adopted by the security associations SA1 and SA2 are the same, only update keys of traffic flows respectively corresponding to the terminal MS-A and the terminal MS-B to the public key without updating the security associations respectively corresponding to the terminals MS-A and MS-B.

Figure 6:
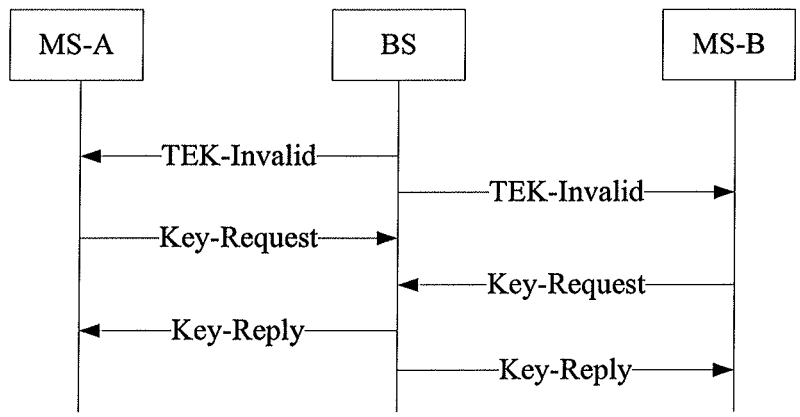
FIG. 6 is a signaling flow chart when only traffic flow key updating needs to be performed in Embodiment 2 of the present invention.

As shown in FIG. 6, the base station BS sends a traffic flow key invalid (TEK Invalid) message to the terminals MS-A and MS-B each, where the traffic flow key specified by the message is invalid, and a user is notified of updating the specified traffic flow key in time. After receiving the traffic flow key invalid (TEK Invalid) message, the terminals MS-A and MS-B each send a key request (Key-Request) message to the base station BS to re-apply for a new traffic flow key, so that the base station BS sends a key reply (Key-Reply) message to the terminals MS-A and MS-B each, so as to deliver the newly allocated traffic flow key to the terminal MS-A and the terminal MS-B, where the key reply (Key-Reply) message that the base station BS sends to the terminals MS-A and MS-B carries the public key.

In the above procedure, a sequence for sending the traffic flow key invalid (TEK Invalid) message to the terminals MS-A and MS-B is not limited in the present application.

Definitely, another situation exists, that is, the base station BS uses a key of a related traffic flow of the terminal MS-A or MS-B as the public key. In such case, the traffic flow keys adopted by the MS-A and MS-B do not need to be updated at the same time; instead, only the traffic flow key adopted by the terminal MS-B or MS-A needs to be updated, that is, the key of the related traffic flow of one terminal is used as the public key and the public key is set for the traffic flow corresponding to the other terminal.

S43: When the encryption and decryption algorithms adopted by the security associations SA1 and SA2 are different, update the security associations of related traffic flows of the terminal MS-A and the terminal MS-B, so that the security associations respectively corresponding to the related traffic flows of the terminals MS-A and MS-B adopt the same encryption and decryption algorithm; and update keys respectively corresponding to the related traffic flows of the terminals MS-A and MS-B to the public key.

In view of two situations of the implementation procedure of security association updating, correspondingly, the specific implementation of step S43 also includes the following two situations:

In the first situation:

The encryption and decryption algorithm adopted by the security association of the related traffic flow of one terminal in the terminals MS-A and MS-B can be supported by both of the terminals MS-A and MS-B, and at this time, only the security association of the related traffic flow of the other terminal needs to be updated.

Figure 7:
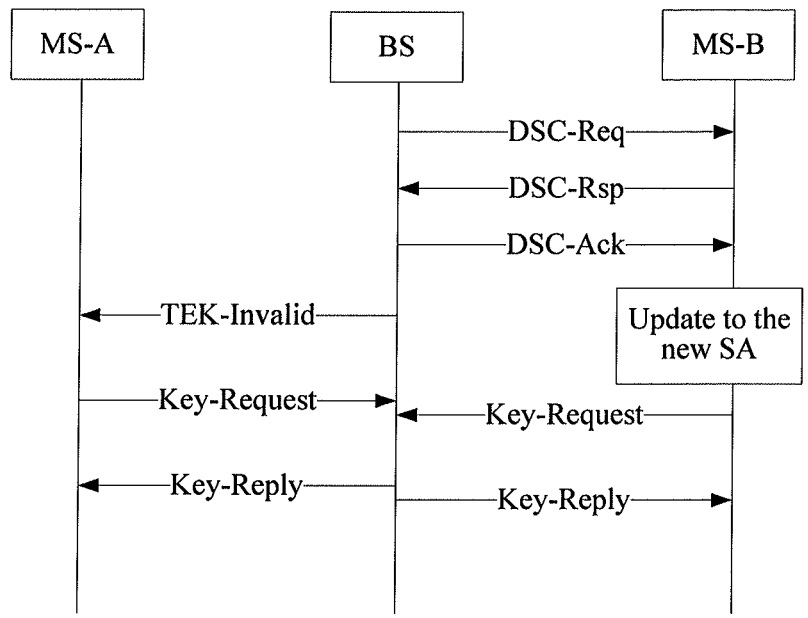
FIG. 7 is a signaling flow chart of performing SA updating on a terminal in Embodiment 2 of the present invention.

It is taken as an example that the terminal MS-B can support the encryption and decryption algorithm adopted by the security association SA1 corresponding to the terminal MS-A, and an updating procedure of the security association SA2 corresponding to the terminal MS-B is shown in FIG. 7.

First, the base station BS modifies, according to the algorithm of the security association SA1 of the traffic flow of the terminal MS-A, namely the uplink traffic flow, the algorithm of the SA2 of the traffic flow of the MS-B, namely the downlink traffic flow, so as to obtain a new algorithm identifier of the SA2. A new encryption and decryption algorithm adopted by the SA2 is the same as the encryption and decryption algorithm adopted by the SA1. Then, the base station BS sends the algorithm identifier SAID corresponding to the newly set SA2 to the terminal MS-B through a dynamic traffic change request (DSC-Req) message, so as to notify the terminal MS-B of performing the security association updating. The terminal MS-B updates the security association algorithm identifier of the specified traffic flow, namely the downlink traffic flow, to a new value according to an indication in a dynamic traffic change request (DSC-Req), and then the MS-B returns a dynamic traffic change response (DSC-Rsp) message to the base station, indicating that the SA updating is completed. Through the above procedure, the encryption algorithm used by the SA2 of the terminal MS-B is updated to a new encryption algorithm.

After the updating of the SA2 is completed, the traffic flow keys respectively corresponding to the terminals MS-A and MS-B may be further updated.

The related security association of the terminal MS-B has been updated, so the MS-B naturally requests a new traffic flow key from the base station, that is, when the security association SA of the traffic flow is updated, the terminal naturally requests a new traffic flow key from the BS. Therefore, the terminal MS-B subsequently sends a key request message to the base station BS actively, and the base station sends the new traffic flow key to the MS-B through a key reply message. The new traffic flow key is the public key that the base station sets for the locally routed uplink traffic flow and downlink traffic flow in communications between the MS-A and MS-B.

In another aspect, when the base station updates the encryption algorithm of the security association of the downlink traffic flow of the MS-B or after the updating is completed, the base station BS sends a traffic flow key invalid (TEK Invalid) message to the MS-A, so as to notify the user of invalidity of the traffic flow key corresponding to the terminal MS-A and of updating the traffic flow key in time, which triggers the MS-A to send the key request message to obtain the new key. The base station BS sends the public key that is newly set in the key replay message. In the above procedure, the terminal MS-A updates the traffic flow key, and the terminal MS-B updates the SA and the traffic flow key. Finally, the terminals MS-A and MS-B adopt the same encryption and decryption algorithm and obtain the same traffic flow key.

In the second situation:

Neither of the terminals MS-A and MS-B supports the encryption and decryption algorithm adopted by the security association of the opposite party, that is, neither of the encryption and decryption algorithms adopted by the security associations SA1 and SA2 can be supported by the both terminals at the same time. In such case, the security associations respectively corresponding to the terminals MS-A and MS-B need to be updated at the same time, so that the terminals adopt the same encryption and decryption algorithm.

Figure 8:
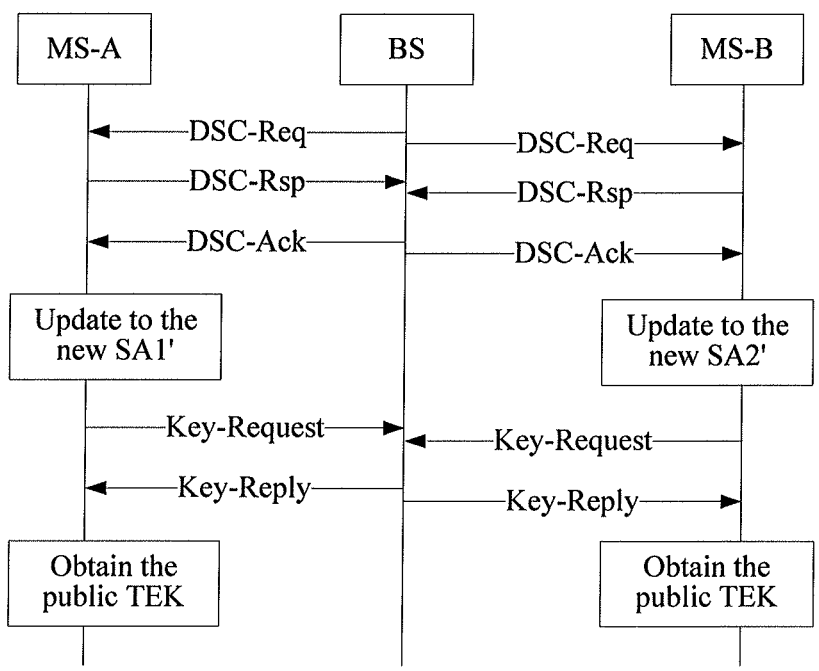
FIG. 8 is a signaling flow chart of performing SA and traffic flow key updating on two terminals at the same time in Embodiment 2 of the present invention.

As shown in FIG. 8, the base station BS selects an encryption algorithm supported by both parties according to the encryption and decryption algorithms supported by the terminals MS-A and MS-B, and modifies the encryption algorithms of the security associations of the uplink traffic flow of the terminal MS-A and the downlink traffic flow of the MS-B through a dynamic traffic change request (DSC-Req) message. After receiving the dynamic traffic change request (DSC-Req) message, the terminals MS-A and MS-B update the encryption algorithms of local related security associations. The encryption algorithms are changed, so both terminals send a traffic flow key request message to the terminal to obtain a new key. Subsequently, the base station sends the set public key to the two terminals each through a traffic flow key reply message. The above step 403 and step 404 provide the optimized security association and traffic flow key for the subsequent local routing and forwarding of the same traffic flow data packet after the base station BS judges that the uplink traffic flow where the received encrypted data packet belongs can be routed locally, so that the base station BS may perform forwarding without decrypting the subsequent encrypted data packets in the uplink traffic flow The above procedure that the base station BS updates the traffic flow key of the terminal MS is merely a specific implementation method. The inventor regards it as an implementation method with smallest change to the existing specifications. The specific implementation method may also be that the base station directly sends the public key to the MS-A and/or MS-B, which is not limited herein.

405: If the local routing processing has been performed on the uplink traffic flow where the encrypted data packet belongs, perform local routing and forwarding processing on the encrypted data packet. In the present invention, if an uplink traffic flow is set to be locally routed, it indicates that the public key of the uplink traffic flow and the corresponding downlink traffic flow has been set through the above step 404. Specifically, the base station BS may judge whether the traffic flow key adopted by the encrypted data packet is the public key according to a key identifier TEK-ID carried in the encrypted data packet.

The TEK-ID in an encrypted text message is a field that occupies 2 bits, and a value thereof ranges from 0 to 3. When the traffic flow key is updated, the corresponding TEK-ID is also updated. That is, the corresponding TEK-ID is also updated during the procedure of setting the traffic flow key to the public traffic flow key in the previous step. The base station BS records a corresponding relationship between the TEK-ID and the traffic flow key, and records whether this traffic flow key is the public key used in corresponding local routing communications. Therefore, the base station BS may know whether the traffic flow key used by the packet is the public key after obtaining the TEK-ID carried in the encrypted data packet.

If the base station BS judges that the traffic flow key of the uplink encrypted data packet is not the public key, or the traffic flow key of the downlink traffic corresponding to the uplink traffic flow where the uplink encrypted data packet is located has not been updated to the public key, the base station BS, according to the existing forwarding manner of the encrypted data packet, first uses the traffic flow key (may or may not be the public key) corresponding to the TEK-ID in the received encrypted data packet to decrypt the encrypted data packet, and then uses the traffic flow key (may or may not be the public key) currently adopted by the corresponding downlink traffic flow to re-encrypt the decrypted data, so as to encapsulate the re-encrypted data into a downlink encrypted data packet and send the packet to the terminal MS-B through the downlink traffic flow.

During the procedure of executing step 404, that is, during the procedure of updating the traffic flow keys of the terminals MS-A and MS-B, the base station BS keeps receiving data packets sent by the terminal MS-A. During the traffic flow key updating procedure, the traffic flow keys of the terminals MS-A and MS-B are not synchronized, and at this time, the base station BS cannot directly forward the encrypted data packet sent by the terminal MS-A to the terminal MS-B, and also need to decrypt and then encrypt the received encrypted data packet in the above manner.

If the base station BS judges that the traffic flow key adopted by the uplink encrypted data packet is the public key, and the traffic flow key of the corresponding downlink traffic flow has also been updated to the public key, the local routing processing in the BS after the key synchronization is completed.

The local routing processing in the BS after the key synchronization includes: the base station BS does not decrypt the above uplink encrypted data packet, and directly encapsulates the encrypted data into the downlink encrypted data packet and forwards the packet to the MS-B. The TEK-ID in the uplink encrypted data packet is the TEK-ID corresponding to the public traffic flow key of the downlink traffic flow corresponding to the uplink encrypted data packet.

Through the execution of the above steps, the local routing method provided in the embodiment of the present invention is implemented. Through the above method, the base station BS sets the public traffic flow key for the locally routed uplink traffic flow and the downlink traffic flow corresponding to the uplink encrypted data packet, so that the processing of decryption and encryption does not need to be performed on the encrypted text in the data packet when the encrypted data packet is locally routed and forwarded, thereby improving local routing and forwarding efficiency of the base station and reducing power consumption.

Embodiment 3

Corresponding to the above method embodiment, the embodiment of the present invention further provides a base station applicable to implementing the above local routing solution.

Figure 9:
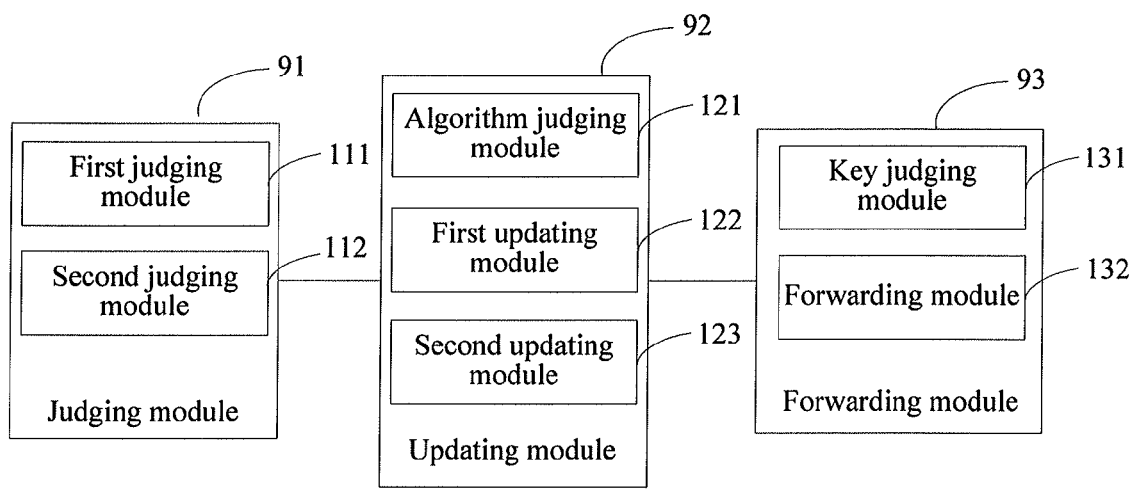
FIG. 9 is a schematic structural diagram of a base station in Embodiment 3 of the present invention.

As shown in FIG. 9, the base station provided in the embodiment of the present invention includes a judging module 91, an updating module 92 and a forwarding module 93.

The judging module 91 is configured to judge whether local routing processing is performed on an uplink traffic flow of a first terminal that serves as a sending end. Afterwards, when an output result of the judging module 91 is yes, the updating module updates an uplink traffic flow key of the first terminal and/or a downlink traffic flow key of a second terminal that serves as a receiving end to a public key, where the public key is a key that can be used by both the uplink data stream and the downlink data stream. In a subsequent local routing procedure, the forwarding module 93 may forward an encrypted data packet of the uplink traffic flow of the first terminal to the second terminal through the downlink traffic flow of the second terminal under a premise that the updating module 92 has finished the key updating procedure, where encryption and decryption operations are not performed on the encrypted data packet before the forwarding or during the forwarding.

The meaning of "encryption and decryption operations are not performed on the encrypted data packet" refers to that the encrypted data packet is not "decrypted or then encrypted".

In the embodiment of the present invention, optionally, the judging module 91 may at least include one of the following modules:

a first judging module 111, configured to judge whether the local routing processing is performed on the uplink traffic flow when a first packet of the uplink traffic flow of the first terminal is received; and a second judging module 112, configured to judge whether the local routing processing is performed on the uplink traffic flow when the uplink traffic flow of the first terminal is created.

In the embodiment of the present invention, optionally, the updating module 92 includes:

an algorithm judging module 121, configured to judge whether an encryption and decryption algorithm adopted by the uplink traffic flow of the first terminal and the downlink traffic flow of the second terminal each is the same;

a first updating module 122, configured to update the key of the uplink traffic flow of the first terminal and/or the key of the downlink traffic flow of the second terminal to the public key when an output result of the algorithm judging module 121 is yes; and a second updating module 123, configured to update an uplink traffic flow encryption and decryption algorithm of the first terminal and/or a downlink traffic flow encryption and decryption algorithm of the second terminal when the output result of the algorithm judging module 121 is no, so that the encryption and decryption algorithms adopted by the uplink traffic flow of the first terminal and the downlink traffic flow of the second terminal are the same, and update the key of the uplink traffic flow of the first terminal and/or the key of the downlink traffic flow of the second terminal to the public key.

In the embodiment of the present invention, optionally, the forwarding module 93 includes:

a key judging module 131, configured to judge, according to a key identifier carried in the encrypted data packet of the uplink traffic flow of the first terminal, whether a key adopted by the encrypted data packet is the public key; and a forwarding module 132, configured to forward the encrypted data packet to the second terminal through the downlink traffic flow of the second terminal when an output result of the key judging module 131 is yes, where the encryption and decryption operation is not performed on the encrypted data packet before the forwarding or during the forwarding.

For a procedure of using the base station provided in the embodiment of the present invention to complete local routing, refer to the method description in Embodiment 2, and details are not described herein again.

In this embodiment, after receiving the encrypted data packet sent by the first terminal that serves as the sending end, the base station first determines whether the encrypted data packet is the first data packet in the current data stream; if the encrypted data packet is the first data packet, and the first data packet needs to be routed locally, the base station starts a security scheme of local routing, updates a security association and packet key; if the encrypted data packet is not the first data packet, related information of the packet key adopted by the encryption is extracted from the encrypted data packet, and is compared with public encryption key information stored in the base station, so as to judge whether the packet key that the sending end adopts to encrypt the data packet is the public encryption key between the first terminal and the second terminal; if yes, the encrypted data packet can be forwarded to the second terminal that serves as the receiving end, and thereby the second terminal decrypts the encrypted data packet. The solution in the embodiment of the present invention is used to complete the local routing under the same base station, so that the base station does not need to perform operations of first decryption and then encryption on the received data packet, which simplifies data processing at the base station during the local routing procedure, and meanwhile reduces system overheads.

Embodiment 4

The embodiment of the present invention further provides a communication system.

Figure 10:
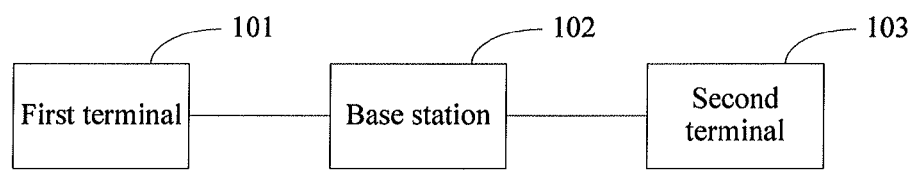
FIG. 10 is a schematic structural diagram of a communication system in Embodiment 4 of the present invention.

As shown in FIG. 10, the communication system includes a first terminal 101 that serves as a sending end, a second terminal 102 that serves as a receiving end, and a base station 103.

The base station 103 is configured to judge whether local routing processing is performed on an uplink traffic flow of the first terminal 101, and update a key of the uplink traffic flow of the first terminal 101 and/or a key of a downlink traffic flow of the second terminal 102 to a public key if a judgment result is yes; forward an encrypted data packet of the uplink traffic flow of the first terminal 101 to the second terminal 102 through the downlink traffic flow of the second terminal 102, where an encryption and decryption operation is not performed on the encrypted data packet before the forwarding or during the forwarding.

In the communication system according to the embodiment of the present invention, after receiving the uplink data stream from the first terminal, the base station extracts related information from therein to determine whether the local routing processing is performed; if the local routing processing is required, the base station updates keys respectively adopted in the encryption and decryption operations of the first terminal and of the second terminal, so that the two keys are maintained uniform. In this manner, in a subsequent local routing procedure, the keys adopted by the uplink traffic flow of the first terminal that serves as the data sending end and the downlink traffic flow of the second terminal that serves as the data receiving end are the same, so operations of first decryption and then encryption on the received encrypted data packet are not required at the base station side. Therefore, data processing at the base station during the local routing procedure is simplified, and meanwhile, system overheads are reduced.

Through the above description of the implementation manner, it is clear to persons skilled in the art that the present invention may be accomplished through hardware, or through software plus a necessary universal hardware platform. Based on this, the technical solution of the present invention or the part that makes contributions to the prior art can be substantially embodied in the form of a software product. The computer software product may be stored in the readable storage media, for example, a ROM/RAM, a magnetic disk, or an optical disk of the computer, and contain several instructions adapted to instruct computer equipment (for example, a personal computer, a server, or network equipment) to perform the method according to the embodiments of the present invention or a part of the embodiments.

The above is only the specific implementation of the present invention, but the protection scope of the present invention is not limited herein. Any change or replacement that can be easily figured out by persons skilled in the art within the technical scope disclosed by the present invention shall be covered by the protection scope of the present invention. Therefore, the protection scope of the present invention shall be the protection scope of the claims.

What is claimed is:

1. A method for implementing local routing of traffic, comprising:
   receiving, by a base station, at least one encrypted data packet in an uplink traffic flow of a first terminal that serves as a sending end;
   afterwards, judging by the base station, whether local traffic routing processing is performed on the at least one encrypted data packet in the uplink traffic flow of the first terminal, wherein the local traffic routing comprising routing of the at least one encrypted data packet from the first terminal to a second terminal within a network through the same base station;
   if it is judged as yes, updating by the same base station, a key of the uplink traffic flow of the first terminal and a key of a downlink traffic flow of the second terminal that serves as a receiving end to a public key; and
   forwarding, by the same base station, the at least one encrypted data packet of the uplink traffic flow of the first terminal to the second terminal through the downlink traffic flow of the second terminal, wherein an encryption and decryption operation is not performed on the at least one encrypted data packet before the forwarding or during the forwarding.

2. The method for implementing local routing of traffic according to claim 1, wherein the judging whether the local routing processing is performed on the uplink traffic flow of the first terminal that serves as the sending end comprises:
   judging whether the local routing processing is performed on the uplink traffic flow when a first encrypted data packet of the uplink traffic flow of the first terminal that serves as the sending end is received; or
   judging whether the local routing processing is performed on the uplink traffic flow when the uplink traffic flow of the first terminal that serves as the sending end is created.

3. The method for implementing local routing of traffic according to claim 1, wherein the updating the key of the uplink traffic flow of the first terminal and/or the key of the downlink traffic flow of the second terminal that serves as the receiving end to the public key comprises:
   judging whether an encryption and decryption algorithm adopted by the uplink traffic flow of the first terminal and the downlink traffic flow of the second terminal each is the same; and
   if it is judged as yes, updating the key of the uplink traffic flow of the first terminal and the key of the downlink traffic flow of the second terminal to the public key.

4. The method for implementing local routing of traffic according to claim 1, wherein the updating the key of the uplink traffic flow of the first terminal and/or the key of the downlink traffic flow of the second terminal that serves as the receiving end to the public key comprises:
   judging whether an encryption and decryption algorithm adopted by the uplink traffic flow of the first terminal and the downlink traffic flow of the second terminal each is the same; and
   if it is judged as no, updating an encryption and decryption algorithm of the uplink traffic flow of the first terminal and an encryption and decryption algorithm of the downlink traffic flow of the second terminal, so that the encryption and decryption algorithms adopted by the uplink traffic flow of the first terminal and the downlink traffic flow of the second terminal are the same, and updating the key of the uplink traffic flow of the first terminal and the key of the downlink traffic flow of the second terminal to the public key.

5. The method for implementing local routing of traffic according to claim 1, wherein the forwarding of the at least one encrypted data packet of the uplink traffic flow of the first terminal to the second terminal through the downlink traffic flow of the second terminal, wherein the encryption and decryption operation is not performed on the at least one encrypted data packet before the forwarding or during the forwarding, comprises:
   judging, according to a key identifier carried in the at least one encrypted data packet of the uplink traffic flow of the first terminal, whether a key adopted by the at least one encrypted data packet is the public key; and
   if it is judged as yes, forwarding the at least one encrypted data packet to the second terminal through the downlink traffic flow of the second terminal, wherein the encryption and decryption operation is not performed before the forwarding or during the forwarding.

6. A base station, comprising:
   a judging module, after receiving at least one encrypted data packet in an uplink traffic flow of a first terminal that serves as a sending end, the judging module is configured to judge whether local routing processing is performed on the at least one encrypted data packet in the uplink traffic flow of the first terminal, wherein the local routing comprises routing of the at least one encrypted data packet from the first terminal to a second terminal within a network through the same base station;
   an updating module, configured to update a key of the uplink traffic flow of the first terminal and/or a key of a downlink traffic flow of the second terminal that serves as a receiving end to a public key when an output result of the judging module is yes; and
   a forwarding module, configured to forward the at least one encrypted data packet of the uplink traffic flow of the first terminal to the second terminal through the downlink traffic flow of the second terminal after the updating module finishes updating the key, wherein an encryption and decryption operation is not performed on the at least one encrypted data packet before the forwarding or during the forwarding.

7. The base station according to claim 6, wherein the judging module at least comprises one of the following modules:
   a first judging module, configured to judge whether local routing processing is performed on the uplink traffic flow when a first encrypted data packet of the uplink traffic flow of the first terminal is received; and
   a second judging module, configured to judge whether local routing processing is performed on the uplink traffic flow when the uplink traffic flow of the first terminal is created.

8. The base station according to claim 6, wherein the updating module comprises:
   an algorithm judging module, configured to judge whether an encryption and decryption algorithm adopted by the uplink traffic flow of the first terminal and the downlink traffic flow of the second terminal each is the same;
   a first updating module, configured to update the key of the uplink traffic flow of the first terminal and the key of the downlink traffic flow of the second terminal to the public key when an output result of the algorithm judging module is yes; and
   a second updating module, configured to update an encryption and decryption algorithm of the uplink traffic flow of the first terminal and an encryption and decryption algorithm of the downlink traffic flow of the second terminal when the output result of the algorithm judging module is no, so that the encryption and decryption algorithms adopted by the uplink traffic flow of the first terminal and the downlink traffic flow of the second terminal are the same, and update the key of the uplink traffic flow of the first terminal and the key of the downlink traffic flow of the second terminal to the public key.

9. The base station according to claim 8, wherein the forwarding module comprises:
   a key judging module, configured to judge, according to a key identifier carried in the at least one encrypted data packet of the uplink traffic flow of the first terminal, whether a key adopted by the at least one encrypted data packet is the public key; and
   a processing module, configured to forward the at least one encrypted data packet to the second terminal through the downlink traffic flow of the second terminal when an output result of the key judging module is yes, wherein the encryption and decryption operation is not performed on the at least one encrypted data packet before the forwarding or during the forwarding.

10. A communication system for performing local routing of traffic, comprising: a first terminal that serves as a sending end, a second terminal that serves as a receiving end, and a base station, wherein the performing of the local routing traffic comprises routing of at least one encrypted data packet from the first terminal to the second terminal within a network through the same base station, wherein:
   the same base station after receiving the at least one encrypted data packet in an uplink traffic flow of the first terminal that serves as a sending end, the same base station is configured to judge whether local routing traffic processing is performed on the at least one encrypted data packet in the uplink traffic flow of the first terminal, and update a key of the uplink traffic flow of the first terminal and a key of a downlink traffic flow of the second terminal to a public key if a judgment result is yes; forward the at least one encrypted data packet of the uplink traffic flow of the first terminal to the second terminal through the downlink traffic flow of the second terminal, wherein an encryption and decryption operation is not performed on the at least one encrypted data packet before the forwarding or during the forwarding.

* * * * *